Figure 4:
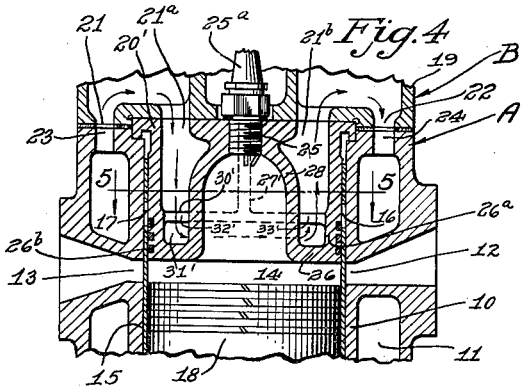

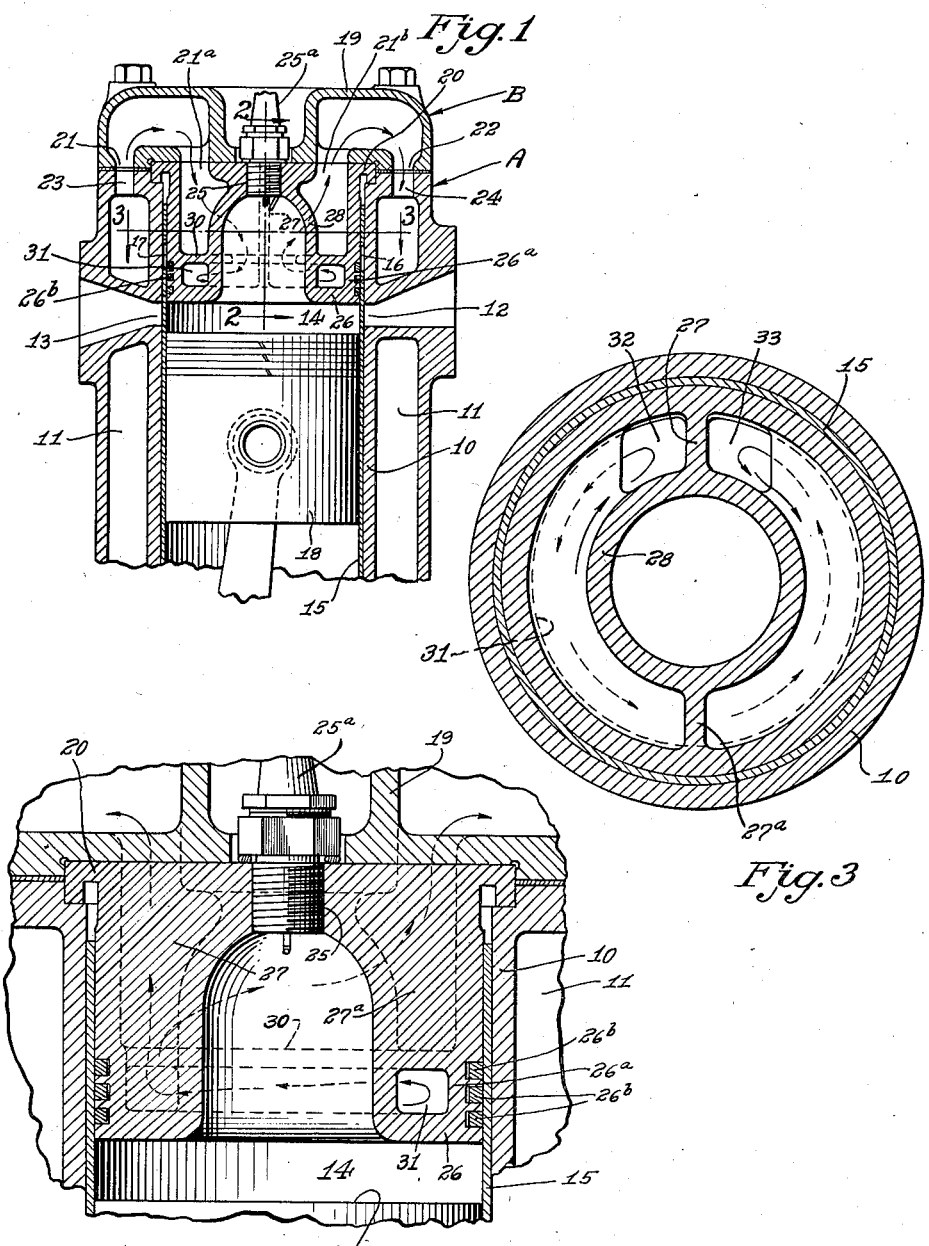

March 19, 1935.  E. T. VINCENT  1,994,548
ENGINE
Filed Feb. 3, 1933   2 Sheets-Sheet 2

INVENTOR.
Edward T. Vincent
BY
ATTORNEY.

Patented Mar. 19, 1935

1,994,548

UNITED STATES PATENT OFFICE 1,994,548

ENGINE

Edward T. Vincent, Detroit, Mich., assignor to Continental Motors Corporation, Detroit, Mich., a corporation of Virginia Application February 3, 1933, Serial No. 655,011

18 Claims. (Cl. 123—173)

This invention relates to internal combustion engines and refers more particularly to improvements in cooling the cylinder heads and combustion chambers of engines of the sleeve valve type.

In engines of the aforesaid type, it is customary to close the outer end of each engine cylinder by a cylinder head of the re-entrant type; the cylinder head depending within and spaced from the walls of the cylinder to accommodate the sleeve valve or sleeve valves and to provide the combustion chamber outer bounding wall.

Difficulty has been experienced heretofore in adequately cooling the re-entrant cylinder head and it is an object of my invention to provide improved cooling means for the cylinder heads, combustion chambers, and parts associated therewith, whereby to increase the engine efficiency, reduce carbon formations in the combustion chamber and adjacent thereto, eliminate valve sticking, and generally increase the combustion efficiency.

A further object of my invention resides in the provision of simple and effective means for obtaining an improved circulatory flow of the cooling medium, such as water, through the cylinder head.

Figure 5:
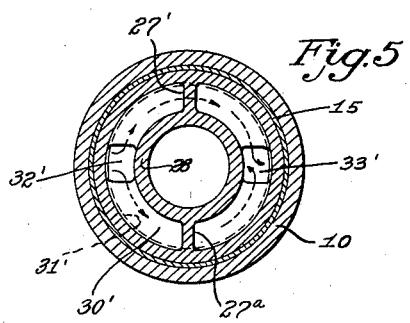
Figure 6:
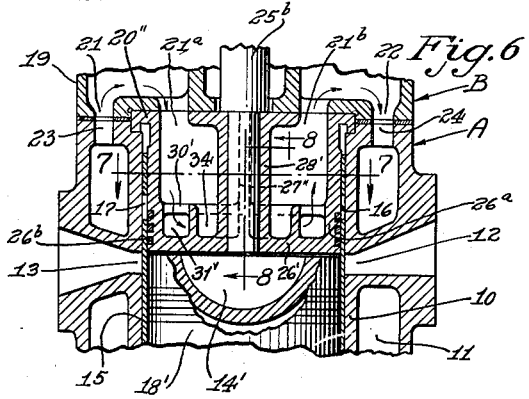
Figure 7:
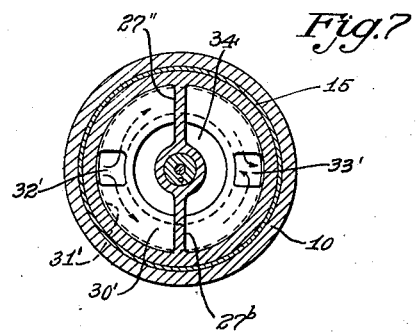
Figure 9:
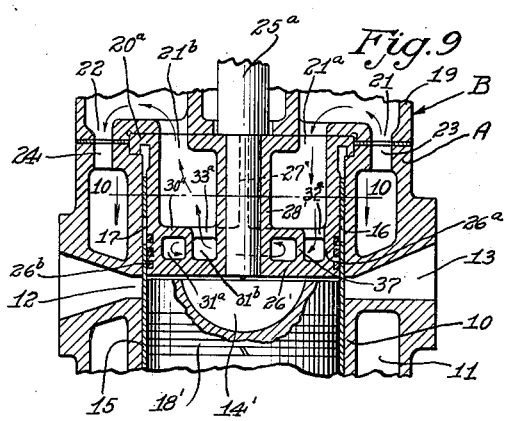
Figure 10:
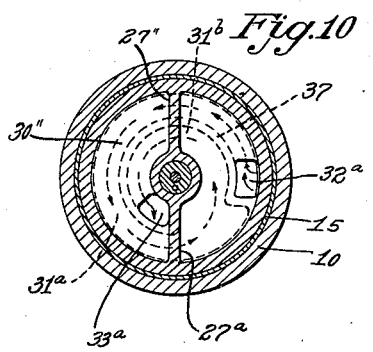
Figure 8:
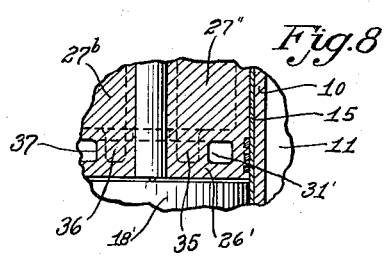

Further objects and advantages of my invention will be apparent from the following specification, reference being made to the accompanying drawings illustrating one embodiment thereof, similar reference characters being used throughout the several views to indicate the same or corresponding parts, and in which:

Fig. 1 represents a sectional elevation view through a typical cylinder of an engine of the spark plug ignition type, Fig. 2 is an enlarged sectional view along the line 2—2 of Fig. 1, Fig. 3 is an enlarged sectional view along the line 3—3 of Fig. 1, Fig. 4 is a view corresponding to Fig. 1 but illustrating a modified form of my invention, Fig. 5 is a sectional view along 5—5 of Fig. 4, Fig. 6 is a view corresponding to Fig. 1 but illustrating an engine of the fuel injection type incorporating my cylinder head improvements in the form substantially as shown in Figs. 4 and 5, Fig. 7 is a sectional view along 7—7 of Fig. 6, Fig. 8 is a detail sectional view along 8—8 of Fig. 6, Fig. 9 is a view corresponding to Fig. 6 but showing a further modified form of my invention, and Fig. 10 is a sectional view along 10—10 of Fig. 9.

In the drawings, reference character A represents the engine having the usual cylinder 10 jacketed at 11 for cooling fluid, the cylinder having the well known ports 12 and 13 for controlling inlet and exhaust gas passage to and from the combustion chamber 14.

Within cylinder 10 is one or more sleeve valves 15 having ports 16, 17 for controlling the cylinder ports 12 and 13. The sleeve valve is illustrated for the well known combined oscillation and reciprocation but may have any other type of movement. Operating within sleeve 15 is the piston 18.

Closing the outer end of cylinder 10, referring first to Figs. 1 to 3, is a cylinder head structure or assembly B which includes the water jacket cover 19 and the depending or re-entrant part 20. The cover 19 has water inlet 21 and outlet 22 respectively communicating with the cylinder jacket outlet 23 and inlet 24. An opening 25 is adapted to receive the usual spark plug 25ª for igniting the charge in chamber 14. The part 20 may be an integral part of structure B or separate therefrom.

The cooling water entering cover 19 from inlet 21 passes downwardly into the depending head part 20, circulates around the bottom or inner wall 26 bounding the combustion chamber, and thence upwardly to cover 19 and outlet 22. In Fig. 1 the wall 26 has a dome-shaped portion 28 forming a part of the combustion chamber boundary wall.

I have provided baffles 27 and 27ª extending longitudinally of the engine at the respective sides of the wall 28 and across the jacket surrounding wall 28 whereby to divide the jacketed cylinder head part 20 into jacket passages 21ª and 21ᵇ and to cause the water to flow downwardly in the head part 20, to the left side of these baffles as viewed in Fig. 1. Spaced above the bottom wall 26 is a transverse or horizontal baffle or partition 30 forming an annular jacket passage 31 bounded by bottom wall 26, the outside annular wall 26ª of re-entrant part 20, and the combustion chamber wall 28. The partition 30 has inlet and outlet openings 32 and 33 respectively, the baffle 27 in Fig. 1 extending downwardly between these openings to wall 26. Baffle 27ª of Fig. 1 extends only to partition 30 as shown in Fig. 2.

In this manner, the water flowing downwardly in jacket passage 21ª of the depending head 20 to the left of baffles 27 and 27ª enters inlet 32 and cannot escape through outlet 33 until it has circulated substantially annularly or circumferentially around the passage 31, whence the water flows upwardly in jacket passage 21$^b$ to the right of baffles 27 and 27$^a$ to the outlet 24. The arrows in the several views indicate the path of fluid flow, it being understood that the usual water pump (not shown) is provided to induce a flow of the cooling fluid throughout the cooling system in accordance with conventional practice. It will be noted that the annular wall 26$^a$ extends adjacent to the outer end of the sleeve valve 15 and carries one or more rings 26$^b$ pressing outwardly against the sleeve valve to prevent the escape of pressure from the combustion chamber. The wall 26$^a$ and rings 26$^b$ heretofore have been very difficult to cool and as a result thereof, carbon and other deposits tend to collect in the vicinity of these parts, having a binding influence on the sleeve 15 and rings 26$^b$. My invention overcomes these difficulties.

It will be noted that the cross-sectional area of passage 31 is preferably, for best results, considerably less than that of the jacket passages 21$^a$ and 21$^b$ in part 20 to either side of baffles 27, 27$^a$, whereby the velocity of fluid flow through passage 31 is relatively increased, the quantity of fluid flow being substantially the same in either instance. This greatly increases the cooling efficiency since the high velocity cooling water has a scrubbing effect against the walls bounding passage 31 and particularly walls 26, 26$^a$ and 28. Heretofore, the cooling water bounding these hot surfaces would form a vapor or bubble film tending to adhere to these walls and produce an insulating sluggish effect against efficient heat conduction. By reason of my invention, the scrubbing effect of the water circulating at relatively high velocity around passage 31 carries away the gas film and increases the efficiency of the cooling action. The cooling arrangement is also facilitated by partition 30 conducting heat from the walls 28 and 26$^a$ in contact therewith. Thus the wall 26$^a$ and rings 26$^b$ are maintained in improved cooling condition by reason of the scrubbing action of the cooling water in passage 31, supplemented to some extent by the heat conduction of partition 30. In the spark plug ignition type of engine shown in Figs. 1 and 4, the scrubbing effect of the water on walls 26 and 28 bounding the combustion chamber is important in minimizing excessive peak temperatures and detonation in the combustion chamber, such action being of somewhat greater importance than when these corresponding combustion chamber walls are a part of a fuel injection engine of general Diesel type illustrated in Figs. 6 and 9 as will presently be apparent. In these latter figures the scrubbing effect of the cooling water on wall 26$^a$ assumes a relatively greater importance.

Referring to Figs. 4 and 5 the cylinder head structure B has a depending part 20' generally similarly constructed as compared with part 20 of Fig. 1 but differing somewhat in the arrangement of baffles. Thus, the corresponding baffle 27' extends only to the partition 30', the baffle 27$^a$ being similarly arranged as in Fig. 1. The partition 30' differs from partition 30 of Fig. 1 by having inlet opening 32' and outlet opening 33' circumferentially between the partitions 27' and 27$^a$. The water passing downwardly to the left of these partitions in jacket passage 21$^a$ of the jacketed part 20', as viewed in Fig. 4, enters inlet 32' and may circulate at the aforesaid increased velocity annularly in passage 31' in opposite directions to the outlet 33', whence the water passes upwardly in jacket passage 21$^b$ to the right of baffles 27' and 27$^a$' as aforesaid. The cooling and scrubbing effect of the water on the walls bounding passage 31' is the same as aforesaid.

Referring to Figs. 6, 7 and 8, the head structure B has the depending part 20" provided with the central cylindrical wall 28' adapted to receive the fuel injection nozzle structure shown somewhat diagrammatically at 25$^b$, the jet of fuel issuing in the well known manner for spraying the combustion chamber 14' in this instance largely formed in piston 18'. The part 20" has its inner wall 26' extending substantially across the combustion chamber and baffles 27" and 27$^b$ guide the water downwardly and upwardly in jacket passages 21$^a$ and 21$^b$ of part 20" as in Fig. 4. Furthermore, the same passage 31' is formed by partition 30' having inlet and outlet openings 32' and 33' constructed and operating as described in connection with the Fig. 4 arrangement. In Figs. 6, 7 and 8, the water jackets of part 20" are preferably extended inwardly between cylindrical wall 28' and passage 31' into cooling contact with wall 26' as indicated by the generally annular trough 34. This trough 34 is preferably divided by extensions 35 and 36 respectively formed as parts of baffles 27" and 27$^b$ whereby the water passing downwardly in jacket passage 21$^a$ to the left of baffles 27" and 27$^b$, as viewed in Fig. 6, cannot pass to the right of these baffles to jacket passage 21$^b$ without first passing through the passage 31' to the outlet 33'. If desired, the trough 34 may be omitted and passage 31' extended inwardly to include the trough, the height of the passage 31' preferably being correspondingly reduced to maintain the desirable relatively high velocity of water flow in passage 31'.

In Figs. 9 and 10, I have illustrated a still further modified form of baffle arrangement wherein the annular flow of water during the scrubbing cooling action is in the general form of a spiral. Thus, the head B has the depending part 20$^a$ generally constructed like the part 20" of Fig. 6, as indicated by the corresponding reference numerals, but differing therefrom in that the partition 30" extends from walls 26$^a$ to 28' and baffles 27" and 27$^a$ terminate inwardly at said partition. The partition 30" has its water inlet opening 32$^a$ communicating with outlet opening 33$^a$ through the passage 31$^a$ which is generally spirally arranged by reason of the vertical wall 37. In Fig. 10 the movement of the water in passage 31$^a$ is represented by the arrows from which it will be noted that the annular flow of water first sweeps a path substantially around the inner end of part 20$^a$ in scrubbing contact, at relatively high velocity, with walls 26$^a$, 26', and 30", whence the flow is annularly in the secondary passage portion 31$^b$ within the first said path and between walls 37 and 28' to the outlet 33$^a$. The water admitted to passage 31$^a$ thus first cools the wall 26$^a$ before passing to the secondary passage portion 31$^b$ whereby to more effectively cool the wall 26$^a$.

Various changes will be suggested from my disclosure and I do not limit my invention to the particular detailed arrangement of parts shown and described for purposes of illustration.

What I claim as my invention is:

1. In an engine of the sleeve valve type, a cylinder jacketed for passage of a cooling fluid, a cylinder head structure of the re-entrant type having a jacketed portion depending within the outer end of said cylinder and spaced therewithin, sleeve valve means between said cylinder and said depending cylinder head portion, means for circulating said cooling fluid between said cylinder jacket and said jacketed cylinder head portion, said depending portion having a bounding wall in the vicinity of the engine combustion chamber, and baffle means associated with said depending portion for causing said fluid to scrub said bounding wall with relatively increased velocity with respect to the fluid flow through said jacket of said depending portion, said baffle means causing said fluid to flow substantially annularly during said scrubbing action about the innermost region of said depending cylinder head portion adjacent said cylinder.

2. In an engine of the sleeve valve type, a cylinder jacketed for passage of a cooling fluid, a cylinder head structure of the re-entrant type having a jacketed portion depending within the outer end of said cylinder and spaced therewithin, sleeve valve means between said cylinder and said depending cylinder head portion, means for circulating said cooling fluid between said cylinder jacket and said jacketed cylinder head portion, said depending portion having a bounding wall in the vicinity of the engine combustion chamber, and baffle means associated with said depending portion for causing said fluid to scrub said bounding wall with relatively increased velocity with respect to the fluid flow through said jacket of said depending portion, said baffle means including a partition extending transversely of the cylinder axis whereby to provide a generally annular passage bounded in part by said bounding wall.

3. In an engine of the sleeve valve type, a cylinder jacketed for passage of a cooling fluid, a cylinder head structure of the re-entrant type having a jacketed portion depending within the outer end of said cylinder and spaced therewithin, sleeve valve means between said cylinder and said depending cylinder head portion, means for circulating said cooling fluid between said cylinder jacket and said jacketed cylinder head portion, said depending portion having a bounding wall in the vicinity of the engine combustion chamber, and baffle means associated with said depending portion for causing said fluid to scrub said bounding wall with relatively increased velocity with respect to the fluid flow through said jacket of said depending portion, said baffle means including cooperating substantially vertical and horizontal baffles for directing fluid flow downwardly toward said bounding wall, generally circumferentially of said depending portion in contact with said bounding wall, and thence upwardly therefrom.

4. In an engine of the sleeve valve type, a cylinder jacketed for passage of a cooling fluid, a cylinder head structure of the re-entrant type having a portion depending within the outer end of said cylinder and spaced therewithin, said depending portion being jacketed for cooling fluid flow therein, sleeve valve means between said cylinder and said depending cylinder head portion, means for circulating said cooling fluid between said cylinder jacket and said jacketed cylinder head portion, said depending portion having a bounding wall in the vicinity of the engine combustion chamber, and baffle means associated with said depending portion for causing said fluid to scrub said bounding wall with relatively increased velocity with respect to the fluid flow through said jacket of said depending portion, said baffle means dividing said jacketed head portion to provide jacket passages, said baffle means including a partition associated with said bounding wall to provide a substantially annular passage having a cross-sectional area relatively less than that of said jacket passages, said partition having an inlet opening to said substantially annular passage and an outlet opening therefrom, said inlet and outlet being located for separate communication with said jacket passages respectively.

5. In an engine cylinder head structure of the cylinder re-entrant type, a depending portion jacketed to receive a cooling fluid, said depending portion having an inner wall portion adapted to bound the engine combustion chamber, partition means within said jacket and spaced from said inner wall portion to provide a passage bounded by said inner wall portion, and baffle means within said jacket cooperating with said partition means to cause cooling fluid circulation inwardly of said jacket to said passage and thence outwardly therefrom.

6. In an engine cylinder head structure of the cylinder re-entrant type, a depending portion jacketed to receive a cooling fluid, said depending portion having a wall in the vicinity of the engine combustion chamber, partition means within said jacket to provide a passage bounded by said wall, and baffle means within said jacket cooperating with said partition means to cause cooling fluid circulation inwardly of said jacket to said passage and thence outwardly therefrom, said partition means lying substantially transversely of the axis of said depending portion.

7. In an engine cylinder head structure of the cylinder re-entrant type, a depending portion jacketed to receive a cooling fluid, said depending portion having an inner wall adapted to bound the engine combustion chamber, partition means within said jacket and spaced from said wall to provide a passage bounded by said inner wall, and baffle means within said jacket cooperating with said partition means to cause cooling fluid circulation inwardly of said jacket to said passage and thence outwardly therefrom, said partition means lying substantially transversely of the axis of said depending portion, said partition means having inlet and outlet openings between said jacket and passage and respectively communicating with said jacket on opposite sides of said partition means.

8. In an engine cylinder head structure of the cylinder re-entrant type, a depending portion jacketed to receive a cooling fluid, said depending portion having an inner wall adapted to bound the engine combustion chamber, partition means within said jacket and spaced from said wall to provide a passage bounded by said inner wall, and baffle means within said jacket cooperating with said partition means to cause cooling fluid circulation inwardly of said jacket to said passage and thence outwardly therefrom, said partition means lying substantially transversely of the axis of said depending portion, said partition means having inlet and outlet openings between said jacket and passage, said openings being located to cause circulation of said fluid substantially circumferentially of said inner wall in opposite directions within said passage.

9. In an engine cylinder head structure of the cylinder re-entrant type, a depending portion jacketed to receive a cooling fluid, said depending portion having a bounding wall adapted to lie in the vicinity of the engine combustion chamber, partition means within said jacket and associated with said wall to provide a substantially spiral passage bounded in part by said wall, and baffle means within said jacket cooperating with said partition means to cause cooling fluid circulation inwardly of said jacket to said passage and thence outwardly therefrom, said baffle means dividing said jacket to substantially confine fluid flow transversely of said depending portion to said passage.

10. In an engine cylinder head structure of the cylinder re-entrant type, a depending portion jacketed to receive a cooling fluid, said depending portion having an inner wall adapted to bound the engine combustion chamber, partition means within said jacket and spaced from said wall to provide a passage bounded by said inner wall, and baffle means within said jacket cooperating with said partition means to cause cooling fluid circulation inwardly of said jacket to said passage and thence outwardly therefrom, said partition means lying substantially transversely of the axis of said depending portion, said baffle means dividing said jacket in the general direction of the axis of said depending portion whereby to substantially confine fluid flow transversely therein to said passage.

11. In an engine cylinder head structure of the cylinder re-entrant type, a depending portion jacketed to receive a cooling fluid, said depending portion having an inner wall adapted to bound the engine combustion chamber, partition means within said jacket and spaced from said wall to provide a passage bounded by said inner wall, and baffle means within said jacket cooperating with said partition means to cause cooling fluid circulation inwardly of said jacket to said passage and thence outwardly therefrom, said partition means lying substantially transversely of the axis of said depending portion, said partition means having inlet and outlet openings between said jacket and passage, said baffle means lying between said openings whereby to prevent direct fluid flow therebetween.

12. In an engine cylinder head structure of the cylinder re-entrant type, a depending portion jacketed to receive a cooling fluid, said depending portion having an inner wall adapted to bound the engine combustion chamber, partition means within said jacket and spaced from said wall to provide a passage bounded by said inner wall, and baffle means within said jacket cooperating with said partition means to cause cooling fluid circulation inwardly of said jacket to said passage and thence outwardly therefrom, said partition means lying substantially transversely of the axis of said depending portion, said partition means having inlet and outlet openings between said jacket and passage, said baffle means lying between said openings whereby to prevent direct fluid flow therebetween, said baffle and partition means causing fluid flow in said passage substantially circumferentially of said depending portion.

13. In an engine cylinder head structure of the cylinder re-entrant type, a cylinder depending portion jacketed for cooling fluid flow and provided with an inner wall having a substantially outwardly extending generally dome-shaped portion, said inner wall providing a boundary for the engine combustion chamber, and baffle means within said jacket providing a substantially annular passage about said generally dome-shaped portion, said baffle means having inlet and outlet openings between said jacket and passage.

14. In an engine cylinder head structure of the cylinder re-entrant type, a cylinder depending portion jacketed for cooling fluid flow and provided with an inner wall having a substantially outwardly extending generally dome-shaped portion, said inner wall providing a boundary for the engine combustion chamber, and baffle means within said jacket providing a substantially annular passage about said generally dome-shaped portion, said baffle means having inlet and outlet openings between said jacket and passage, said passage being bounded by said inner wall.

15. In an engine cylinder head of the jacketed re-entrant type, a bounding wall adapted to lie in the vicinity of the engine combustion chamber, and baffle means within said jacket for directing a cooling fluid to flow axially of the cylinder head and substantially circumferentially thereof in contact with said bounding wall.

16. In an engine cylinder head of the jacketed re-entrant type, a bounding wall adapted to lie in the vicinity of the engine combustion chamber, and including an inner wall extending substantially transverse of the cylinder axis, a partition spaced from said inner wall and bounding an annular passage, baffle means within said jacket portion of the head and extending substantially axially of the head, said partition having inlet and outlet openings respectively communicating with the jacket on either side of said baffle means.

17. In an engine cylinder head of the jacketed re-entrant type, a bounding wall adapted to lie in the vicinity of the engine combustion chamber, and including an inner wall extending substantially transverse of the cylinder axis, a partition spaced from said inner wall and bounding an annular passage, baffle means within said jacket portion of the head and extending substantially axially of the head, said partition having inlet and outlet openings respectively communicating with the jacket on either side of said baffle means, and baffle means extending transverse of the annular passage whereby to induce cooling fluid flow in one direction in said passage.

18. In an engine cylinder head of the jacketed re-entrant type, a bounding wall adapted to lie in the vicinity of the engine combustion chamber, and including an inner wall extending substantially transverse of the cylinder axis, a partition spaced from said inner wall and bounding an annular passage, baffle means within said jacket portion of the head and extending substantially axially of the head, said partition having inlet and outlet openings respectively communicating with the jacket on either side of said baffle means, said annular passage extending generally circumferentially adjacent the outer circular wall of the re-entrant head, the cooling fluid acting to scrub the inside surface of the outer circular wall of the re-entrant head during the cooling fluid flow through said passage.

EDWARD T. VINCENT.